United States Patent [19]

Parquet

[11] 4,360,074
[45] Nov. 23, 1982

[54] HYDRAULIC ANTI-THEFT DEVICE

[75] Inventor: Donald J. Parquet, Burlington, Iowa

[73] Assignee: J. I. Case Company, Racine, Wis.

[21] Appl. No.: 214,535

[22] Filed: Dec. 8, 1980

[51] Int. Cl.³ .............................................. B60R 25/04
[52] U.S. Cl. ...................................... 180/287; 70/263; 280/763
[58] Field of Search ............... 280/763, 764, 765, 766; 180/272, 287; 137/384.4, 385, 613; 70/263, 264

[56] References Cited

U.S. PATENT DOCUMENTS

| | | | |
|---|---|---|---|
| 3,836,173 | 9/1974 | Schwaiger | 280/763 |
| 3,874,682 | 4/1975 | Dalton | 280/766 |
| 4,022,137 | 5/1977 | Chiu | 137/384.4 |
| 4,295,661 | 10/1981 | Maurer | 280/765 |

Primary Examiner—Joseph F. Peters, Jr.
Assistant Examiner—John A. Carroll
Attorney, Agent, or Firm—Cullen, Sloman, Cantor, Grauer, Scott & Rutherford

[57] ABSTRACT

A hydraulic anti-theft locking device is provided for backhoes and other construction machines which may be set to render the machines inoperable and incapable of movement. The locking device includes an assembly of rotary flow control valves that must be moved to a particular orientation before the machine can be made operable. In an illustrative embodiment, the control valve assembly is mounted to the extensible stabilizer cylinder of a backhoe. The stabilizer cylinder is extended to raise the tractor wheels off the ground, and the valves are positioned to prevent hydraulic fluid from leaving the load supporting end of the cylinder thereby holding up the rear end of the tractor such that the backhoe cannot be moved. The locking device is easily accessible and provides an easy method for the operator to set his own unique combination for locking the machine to make it inoperable. Attempts to bypass the locking device to make the machine operable would be extremely time-consuming and require tools and equipment not commonly available.

1 Claim, 3 Drawing Figures

HYDRAULIC ANTI-THEFT DEVICE

BACKGROUND OF THE INVENTION

The present invention relates to a hydraulic anti-theft device for backhoes and other construction machines, and more particularly, to a series of rotary control valves that must be moved to a particular orientation before the machine can be made operable.

Construction equipment has become a prime target for theft in recent years because of its high value. A problem with using conventional locking devices such as key locks, locking chains, etc., is that such devices may be opened or bypassed by modern-day thieves who have sophisticated equipment and techniques for practicing their trade. Thus, there has been a need for a locking device for construction machines which renders the machines incapable of movement and which would be extremely time-consuming to bypass.

Another problem with providing any anti-theft device for construction machinery relates to the ease of using it and its accessibility. If the locking device is difficult to operate because of its complexity or location on the machine, there is less likelihood that the operator will use it. Thus, there has been a need for an accessible locking device which may be easily operated and controlled by the operator but not operable by other persons.

SUMMARY OF THE INVENTION

The hydraulic anti-theft locking device of the present invention includes an assembly of rotary flow control valves that must be moved to a particular orientation before the machine can be made operable. In an illustrative embodiment, the control valve assembly is mounted to the extensible stabilizer cylinder of a backhoe. The stabilizer cylinder is extended to raise the rear tractor wheels off the ground, and the valves are positioned to prevent hydraulic fluid from leaving the load supporting end of the cylinder thereby holding up the rear end of the tractor such that the backhoe cannot be moved.

The locking device may also be connected to the extensible cylinder that controls the backhoe bucket boom. The bucket is extended into the ground and held in that position by positioning the control valves to prevent hydraulic fluid from leaving the boom cylinder thereby holding the bucket in the ground. The backhoe is not movable until the valves are moved to an unlocked open flow position.

The locking device includes a rectangular valve body having a series of longitudinally aligned cylindrical housings through one end of the body for mounting an equal number of rotatable flow control valves. The valve body further includes an inlet port through one of the body sides which is connected to an inlet cylindrical housing and an outlet port through an opposed side of the body which is connected to an outlet cylindrical housing. The inlet and outlet cylindrical housings are interconnected by a flow passage which is transverse to their longitudinal axes to permit fluid flow through the body from the inlet port to the exhaust port when the rotatable valves are moved to an open flow position.

The locking device is operable with two control valves, an inlet valve being mounted in the inlet cylindrical housing and an outlet valve being mounted within the outlet cylindrical housing. It is preferred that one or more intermediate control valves also be provided between the inlet and outlet valves.

The inlet and outlet control valves can be identical, each one including a cylindrical core having an L-shaped flow passage transverse to its longitudinal axis for connecting either the inlet or outlet ports to the transverse flow passage through the valve body. Each intermediate control valve also includes a cylindrical core which can have a straight line flow passage transverse to its longitudinal axis. The flow passage of the intermediate valve is selectively aligned with the transverse flow passage through the valve body to permit fluid flow through the body from the inlet port to the exhaust port when the inlet and outlet valves are positioned for open flow.

The control valves includes rotatable indicator knobs at one of their ends for setting the locked and unlocked positions of the valves. Each knob includes indicia similar to a combination lock with certain indicia being selectively alignable with the ends of the flow passages through the control valves to provide the operator with a means of selectively setting the valves to an unlocked or locked position. The valve knobs are adjustable such that the operator may periodically change the combination for the locking device. Further, covers are provided for the knobs to hide the combination used for unlocking the device when the machine is in operation.

The locking device of the present invention provides an easy method for the operator to set his own unique combination for locking the machine to make it inoperable. The locking control is easily accessible and not operable by a person other than the operator. Attempts to bypass the locking device to make the machine operable would be extremely time-consuming and require tools and equipment not commonly available.

Other advantages and meritorious features of the hydraulic anti-theft locking device of the present invention will be more fully understood from the following description of the preferred embodiment, the appended claims, and the drawings, a brief description of which follows.

DETAILED DESCRIPTION OF THE INVENTION

Figure 1:
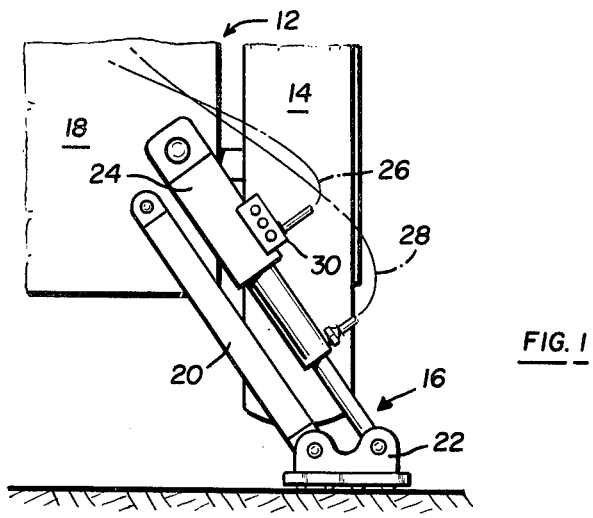
FIG. 1 is a partial rear view of a backhoe with the locking device of the present invention mounted to the extensible stabilizer cylinder.
Figure 2:
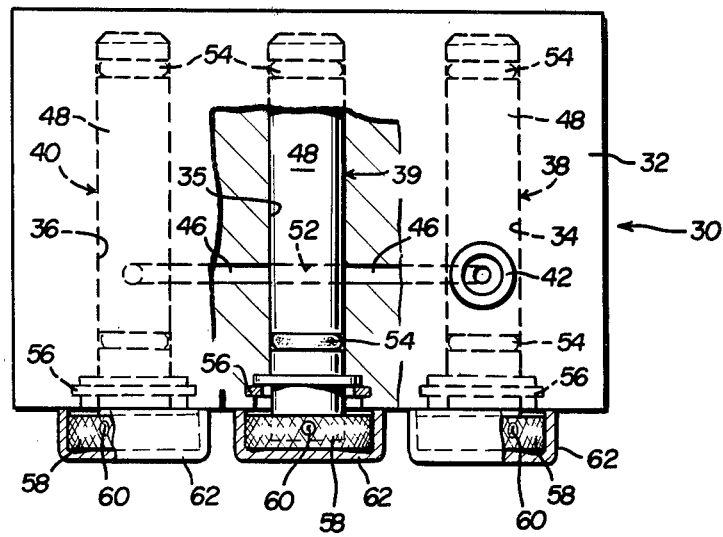
FIG. 2 is a top view of the locking device with a portion cut away for easier viewing.
Figure 3:
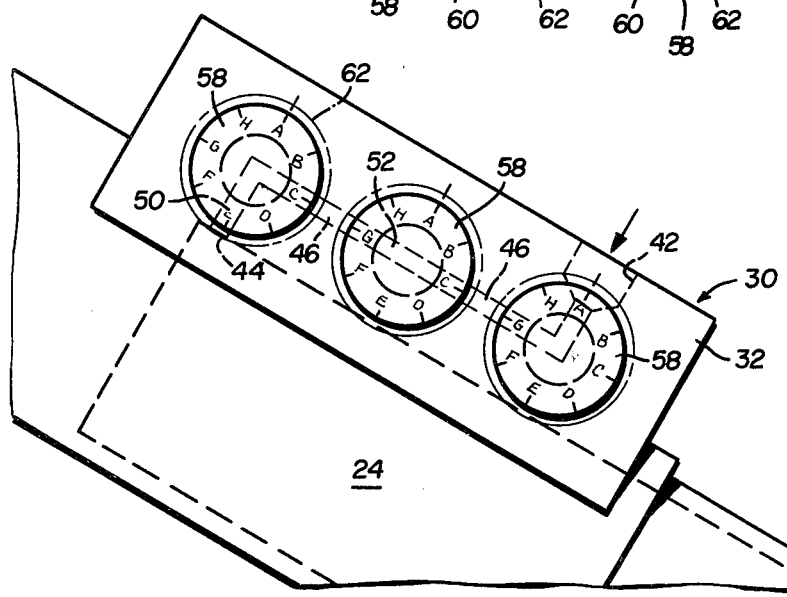
FIG. 3 is a partial side elevational view illustrating the locking device mounted to the extensible stabilizer cylinder.

A backhoe having the hydraulic anti-theft locking device according to the present invention is illustrated in FIGS. 1-3. FIG. 1 partially illustrates a conventional tractor mounted backhoe 10 including a tractor 12 with rear ground-engaging wheels 14 which normally support the tractor for movement from one location to another.

A pair of stabilizing arm assemblies 16 (only one being shown) are pivotally attached to the sides of the tractor frame 18 for stabilizing the machine on the ground when the machine is in a working position. Normally, the stabilizing arm assemblies 16 extend from the lateral sides of the frame 18 in a direction substantially normal to the longitudinal centerline of the tractor and protrude outwardly to a point beyond the dimension of the wheel base of the tractor.

The stabilizing arm assembly 16 includes a lower rigid strut member 20, one end of which is provided with a pivotal ground-engaging pad member 22 for supporting the stabilizer assembly upon a ground surface when the earth-working machine is in an operating position. Stabilizing arm assembly 16 further includes a piston-cylinder actuator 24 or stabilizer cylinder which is pivotally connected between the tractor frame 18 and pad member 22.

Stabilizer cylinder 24 is extended by fluid pressure being supplied to its head end by way of supply line 26 and is retracted by fluid pressure being supplied to its rod end through supply line 28. When hydraulic actuator 24 is extended, the rear tractor wheels 14 are raised off the ground such that the backhoe cannot be moved.

The hydraulic locking device 30 of the present invention is mounted to the extensible stabilizer cylinder 24 of the backhoe to selectively hold the rear tractor wheels 14 off the ground, such that the backhoe cannot be moved. Locking device 30 includes a rectangular valve body 32 having a series of longitudinally aligned cylindrical housings 34-36 through one end of body 32 for mounting an equal number of rotatable flow control valves 38-40. The valve body 32 further includes an inlet port 42 through one of the body sides which is connected to the inlet cylindrical housing 34 and an outlet port 44 through an opposed side of the body which is connected to the outlet cylindrical housing 36. Supply line 26 is connected to inlet port 42 and outlet port 44 is connected to the head end of stabilizer cylinder 24.

The inlet and outlet cylindrical housings 34, 36 are interconnected by a flow passage 46 which is transverse to their longitudinal axes to permit fluid flow through body 32 from the inlet port 42 to the outlet port 44 when the rotatable valves 38-40 are positioned for open flow.

The locking device 30 is operable with only two control valves, namely, the inlet control valve 38 and the oulet control valve 40. It is preferred, however, that one or more intermediate control valves 39 be provided between the inlet and outlet valves 38, 40.

The inlet and outlet control valves 38, 40 are identical, and each one includes a cylindrical core 48 having an L-shaped flow passage 50 transverse to its longitudinal axis for connecting either the inlet or outlet ports 42, 44 to the transverse flow passage 46 through the valve body. Each intermediate control valve 39 also includes a cylindrical core 48 having a straight line flow passage 52 transverse to its longitudinal axis. The straight line flow passage 52 of the intermediate valve 39 is selectively aligned with the transverse flow passage 46 through the valve body to permit fluid flow through the body from the inlet port 42 to the outlet port 44 when the inlet and outlet valves 38, 40 are positioned for open flow.

The control valves 38-40 are rotatably mounted within cylindrical housings 34-36 by means of seals 54 and retainer rings 56. The control valves 38-40 include rotatable indicator knobs 58 at one of their ends for setting the locked and unlocked positions of the valves. Each knob 58 includes indicia similar to a combination lock, as illustrated in FIG. 3, with certain indicia being aligned with the ends of the flow passages 50, 52 through the control valves 38-40 to provide the operator with a means of selectively setting the valves to an unlocked or locked position. The valve knobs 58 are adjustable with set screws 60 such that the operator may periodically change the combination for the locking device. Further, covers 62 are provided for the knobs to hide the combination used for unlocking the device when the machine is in operation.

The assembly of rotary flow control valves 38-40 must be moved to a particular orientation, as illustrated in FIGS. 2 and 3, before the machine can be made operable. When the control valves are positioned as illustrated in FIGS. 2-3, the stabilizer cylinder 24 may be extended or retracted to raise and lower the rear tractor wheels 14 off the ground as desired for operation. The operator may make the machine inoperable by extending the stabilizer cylinder 24 to the position illustrated in FIG. 1, with the rear wheels 14 off the ground, and then turn one or more of the control valves 38-40 to prevent hydraulic fluid from leaving the load supporting end of the cylinder, thereby holding up the rear end of the tractor such that the backhoe cannot be moved.

The locking device 30 may also be connected to the extensible cylinder that controls the backhoe bucket boom (not shown). The bucket is extended into the ground and held there by positioning the control valves 38-40 to prevent hydraulic fluid from leaving the boom cylinder thereby holding the bucket in the ground. The backhoe is not movable until the valves are moved to an unlocked open flow position as illustrated in FIGS. 2-3.

The locking device of the present invention provides an easy method from the operator to set his own unique combination for locking the machine to make it inoperable. The locking control 30 is easily accessible and not operable by a person other than the operator. Attempts to bypass the locking device to make the machine operable would be extremely time-consuming and require tools and equipment not commonly available.

It will be apparent to those skilled in the art that the foregoing disclosure is exemplary in nature rather than limiting, the invention being limited only by the appended claims.

I claim:

1. In an earth-working machine including a tractor and implement attachment, said tractor having rear ground-engaging wheels, and a stabilizer arm assembly for stabilizing the tractor on the ground when the implement attachment is in an operative position, and stabilizing arm assembly including a hydraulic piston-cylinder actuator which is extensible to raise the rear tractor wheels off the ground such that the tractor and implement may not be moved, the improvement comprising:

a locking device mounted to said extensible hydraulic actuator, said locking device including an assembly of flow control valves which are selectively movable between an open flow position permitting extension and retraction of said hydraulic actuator and a locked position to prevent hydraulic fluid from leaving the hydraulic actuator when it is extended for raising the tractor wheels off the ground, thereby rendering the machine immovable;

said locking device including a valve body having a series of longitudinally aligned housings for mounting said flow control valves, said valve body including an inlet port connecting a fluid pressure supply line to one of said housings and an oulet port connecting another housing to said hydraulic actuator, said housings being interconnected by a transverse flow passage to permit fluid flow through said body from the inlet port to the outlet port when said control valves are moved to their open flow position;

said locking device including an inlet flow control valve, an outlet flow control valve, and at least one intermediate flow control valve, said inlet and outlet control valves each including a core having an L-shaped flow passage transverse to the longitudinal axis of the core for connecting either the inlet or outlet ports to the transverse flow passage through said valve body, each intermediate flow control valve including a core with a flow passage, said flow passage being selectively aligned with the flow passage through the valve body to permit fluid flow through the body from the inlet port to the outlet port when the inlet and outlet control valves are positioned for open flow;

said control valves including rotatable indicator knobs at one of their ends for setting the open flow and locked positions of the valves, each knob including indicia which is selectively aligned with the ends of the flow passages through the control valves to provide the operator with a means of selectively setting the valves to an open flow or locked position, and said valve knobs being adjustable such that the operator may periodically change the combination for the locking device; and said knobs including removable cover means for hiding the combination used to unlock the device when the machine is in operation.

* * * * *